(12) United States Patent
Placido et al.

(10) Patent No.: US 11,527,911 B1
(45) Date of Patent: Dec. 13, 2022

(54) FAULT-TOLERANT BATTERY MANAGEMENT SYSTEM AND METHOD

(71) Applicant: APPLETON GRP LLC, Rosemont, IL (US)

(72) Inventors: Leon Jr. Dela Cruz Placido, Antipolo (PH); Tristan Toston Estepa, Makati (PH); Raymart Gabutan Aurora, Pasig (PH); Caferino III Gonzales Villadolid, Mandaluyong (PH)

(73) Assignee: Appleton Grp LLC, Rosemont, IL (US)

( * ) Notice: Subject to any disclaimer, the term of this patent is extended or adjusted under 35 U.S.C. 154(b) by 0 days.

(21) Appl. No.: 17/499,087

(22) Filed: Oct. 12, 2021

(51) Int. Cl.
*H02J 9/06* (2006.01)
*H02J 7/00* (2006.01)

(52) U.S. Cl.
CPC .............. *H02J 9/068* (2020.01); *H02J 7/005* (2020.01); *H02J 7/0034* (2013.01); *H02J 7/007182* (2020.01)

(58) Field of Classification Search
CPC ...... H02J 9/068; H02J 7/005; H02J 7/007182; H02J 7/0034
USPC ......................................................... 307/66
See application file for complete search history.

(56) References Cited

U.S. PATENT DOCUMENTS

| | | |
|---|---|---|
| 5,345,163 A | 9/1994 | Gibbons et al. |
| 5,458,991 A | 10/1995 | Severinsky |
| 5,612,580 A | 3/1997 | Janonis et al. |
| 5,777,454 A | 7/1998 | McAndrews et al. |
| 6,356,058 B1 | 3/2002 | Maio et al. |
| 7,132,832 B2 | 11/2006 | Vaillancourt et al. |
| 7,259,476 B2 | 8/2007 | Frey |
| 7,626,360 B2 | 12/2009 | Melandon |
| 9,000,935 B2 | 4/2015 | Dao et al. |
| 9,581,654 B2 | 2/2017 | Campbell et al. |
| 10,132,868 B2 | 11/2018 | Sun et al. |
| 10,523,019 B2 | 12/2019 | Rohera |
| 10,613,148 B2 | 4/2020 | Izawa |
| 2009/0138767 A1 | 5/2009 | Mochizuki |
| 2019/0128967 A1 | 5/2019 | Cheng et al. |

(Continued)

*Primary Examiner* — Daniel Kessie
*Assistant Examiner* — Dru M Parries
(74) *Attorney, Agent, or Firm* — McDonnell Boehnen Hulbert & Berghoff LLP (57) ABSTRACT

A battery backup system comprises an input terminal configured to receive a source voltage from a power source, and an output terminal electrically coupled to the input terminal and a battery and configured to selectively communicate the source voltage to a load when the source voltage is available and to communicate a battery voltage to the load when the source voltage is unavailable. The battery backup system further comprises a power supply configured to convert the source voltage to a charging voltage and control circuitry electrically coupled to the power supply and the battery and configured to communicate the charging voltage to the battery to facilitate charging the battery when the source voltage is available. The control circuitry is configured to measure one or more parameters of the battery to evaluate battery health. When the battery polarity is reversed, battery terminals through which the battery is electrically coupled are shorted to one another, or the battery is removed, the control circuitry is configured to decouple the charging voltage from the battery.

16 Claims, 4 Drawing Sheets

(56) References Cited

U.S. PATENT DOCUMENTS

2019/0383453 A1    12/2019  Lax et al.
2021/0194274 A1*  6/2021  Nagabhushanrao .... H02J 9/061

* cited by examiner

FAULT-TOLERANT BATTERY MANAGEMENT SYSTEM AND METHOD

BACKGROUND

Field

This application generally relates to battery backup systems in electronic devices. In particular, this application describes a fault-tolerant battery management system and method.

Description of Related Art

Many systems utilize a battery backup system to maintain operations in the event of a loss of power. For instance, a computer may derive power from a battery backup system, which in turn derives power from a line voltage. The battery backup system may route the line voltage to a load (e.g., a computer) when the line voltage is available and route a battery voltage to the load when the line voltage is unavailable. Some battery backup systems include circuitry configured to convert the battery voltage to a voltage that matches the characteristics (e.g., voltage and frequency) of the line voltage.

SUMMARY

In a first aspect, a battery backup system comprises an input terminal configured to receive a source voltage from a power source and an output terminal electrically coupled to the input terminal and a battery and configured to selectively communicate the source voltage to a load when the source voltage is available and to communicate a battery voltage to the load when the source voltage is unavailable. The battery backup system further comprises a power supply configured to convert the source voltage to a charging voltage and control circuitry electrically coupled to the power supply and the battery and configured to communicate the charging voltage to the battery to facilitate charging the battery when the source voltage is available. The control circuitry is configured to measure one or more parameters of the battery to evaluate battery health. When the battery polarity is reversed, battery terminals through which the battery is electrically coupled are shorted to one another, or the battery is removed, the control circuitry is configured to decouple the charging voltage from the battery.

In a second aspect, a system comprises one or more processors, one or more memories, and a battery backup system. The one or more memories store instruction code that is executable by the one or more processors for controlling the system to perform one or more operations. The battery backup system is configured to provide power to the one or more processors and the one or more memories. The battery backup system comprises an input terminal configured to receive a source voltage from a power source, and an output terminal electrically coupled to the input terminal and a battery and configured to selectively communicate the source voltage to a load when the source voltage is available and to communicate a battery voltage to the load when the source voltage is unavailable. The battery backup system further comprises a power supply configured to convert the source voltage to a charging voltage and control circuitry electrically coupled to the power supply and the battery and configured to communicate the charging voltage to the battery to facilitate charging the battery when the source voltage is available. The control circuitry is configured to measure one or more parameters of the battery to evaluate battery health. When the battery polarity is reversed, battery terminals through which the battery is electrically coupled are shorted to one another, or the battery is removed, the control circuitry is configured to decouple the charging voltage from the battery.

In a third aspect, a method for operating a battery backup system comprises communicating, via an output terminal of the battery backup system, a source voltage from a power source to a load when the source voltage from a power source is available and from a battery voltage to the load when the source voltage is unavailable. A power supply of the battery backup system converts the source voltage to a charging voltage. Control circuitry electrically coupled to the power supply and the battery communicates the charging voltage to the battery to facilitate charging the battery when the source voltage is available. The control circuitry measures one or more parameters of the battery to evaluate battery health. The control circuitry decouples the charging voltage from the battery when the battery polarity is reversed, battery terminals through which the battery is electrically coupled are shorted to one another, or the battery is removed.

BRIEF DESCRIPTION OF THE DRAWINGS

The accompanying drawings are included to provide a further understanding of the claims, are incorporated in, and constitute a part of this specification. The detailed description and illustrated examples described serve to explain the principles defined by the claims.

DETAILED DESCRIPTION

Various examples of systems, devices, and/or methods are described herein. Words such as "example" and "exemplary" that may be used herein are understood to mean "serving as an example, instance, or illustration." Any embodiment, implementation, and/or feature described herein as being an "example" or "exemplary" is not necessarily to be construed as preferred or advantageous over any other embodiment, implementation, and/or feature unless stated as such. Thus, other embodiments, implementations, and/or features may be utilized, and other changes may be made without departing from the scope of the subject matter presented herein.

Accordingly, the examples described herein are not meant to be limiting. It will be readily understood that the aspects of the present disclosure, as generally described herein, and illustrated in the figures, can be arranged, substituted, combined, separated, and designed in a wide variety of different configurations.

Further, unless the context suggests otherwise, the features illustrated in each of the figures may be used in combination with one another. Thus, the figures should be viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Moreover, terms such as "substantially," or "about" that may be used herein are meant that the recited characteristic, parameter, or value need not be achieved exactly, but that deviations or variations, including, for example, tolerances, measurement error, measurement accuracy limitations and other factors known to skill in the art, may occur in amounts that do not preclude the effect the characteristic was intended to provide.

Further, terms such as "A coupled to B," "A electrically coupled to B," etc., do not necessarily mean that items A and B are directly coupled to one another. For example, a first component electrically coupled to a second component is interpreted to mean that the components are either directly coupled (e.g., via a conductor) or coupled to one another via one or more resistors, capacitors, inductors, transistors, amplifiers, and/or other active or passive components.

I. Introduction

As noted above, many systems utilize a battery backup system to maintain operations in the event of a loss of power. These systems route the line voltage to a load when the line voltage is available and route a battery voltage to the load when the line voltage is unavailable. The batteries in some of these systems are consumable components in that they degrade over time and require replacement.

However, replacement of the battery is not without risk. For example, an operator may inadvertently insert the battery in reverse or short the battery terminals. This could, in turn, trip a circuit breaker and, thereby, interrupt power to the load. In mission-critical applications such as large data centers, this could lead to catastrophic results.

Examples of battery backup systems that help ameliorate these and other issues are described below. Some examples of the battery backup system include an input terminal configured to receive a source voltage from a power source and an output terminal electrically coupled to the input terminal and a battery and configured to selectively communicate the source voltage to a load when the source voltage is available and to communicate a battery voltage to the load when the source voltage is unavailable. Some examples further comprise a power supply and control circuitry. The power supply is configured to convert the source voltage to a charging voltage. The control circuitry is electrically coupled to the power supply and the battery and is configured to communicate the charging voltage to the battery to facilitate charging the battery when the source voltage is available. The control circuitry is further configured to measure one or more parameters of the battery to evaluate battery health. The control circuitry is configured to decouple the charging voltage from the battery when the battery polarity is reversed, terminals through which the battery is electrically coupled are shorted to one another, or battery replacement is performed while the battery backup system is live which may induce system transients. That is, the control circuitry is configured to decouple the charging voltage from the battery when any of these conditions occurs.

Figure 1:
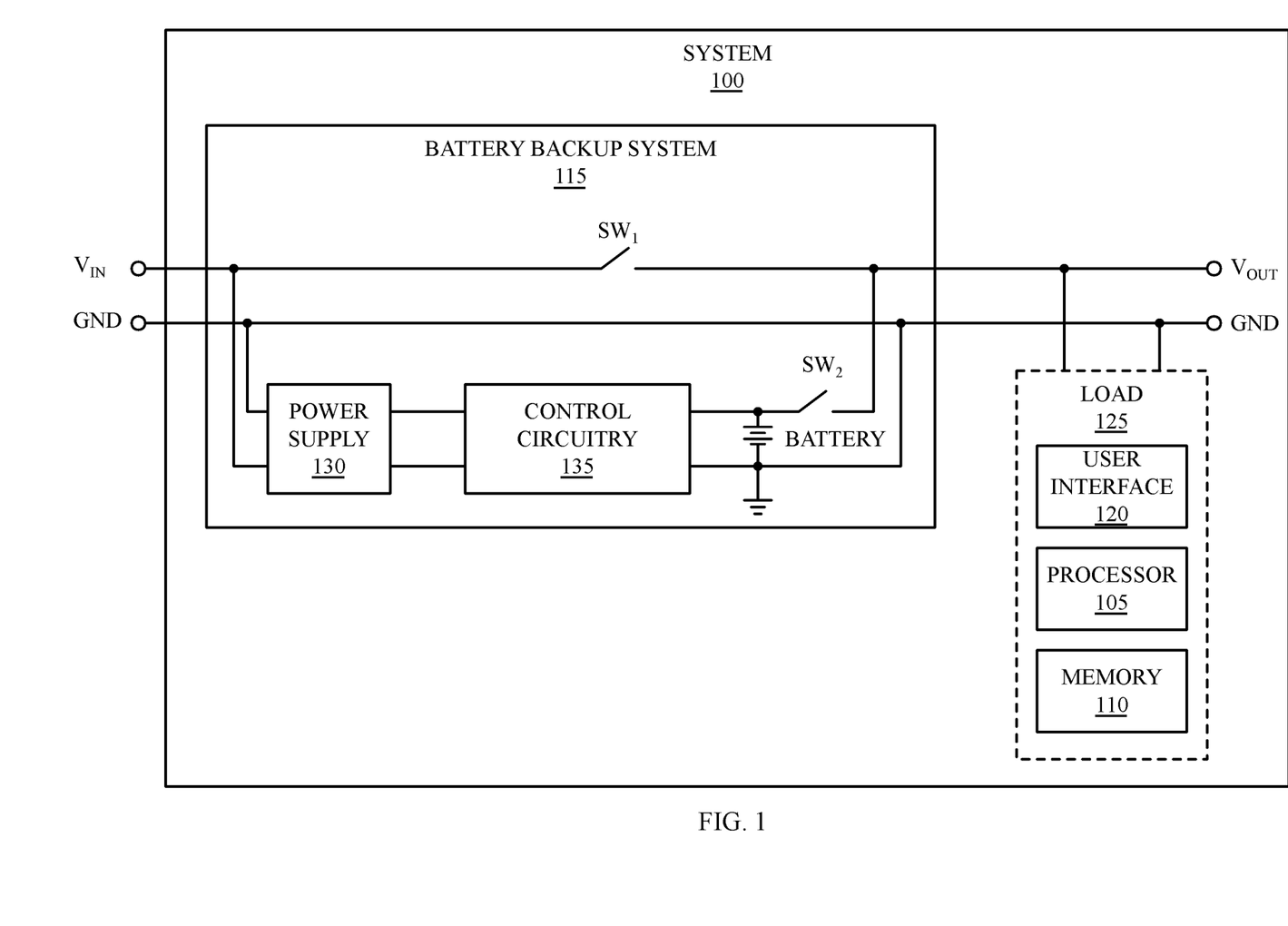
FIG. 1 illustrates a system that includes a battery backup system, in accordance with example embodiments.

FIG. 1 illustrates an example of a system 100. The system 100 comprises a processor 105, a memory 110, and a battery backup system 115. Some examples of the system 100 further comprise a user interface 120. The processor 105, the memory 110, and the user interface 120 form at least part of a load 125 of the system 100.

Some examples of the processor 105 are in communication with the memory 110 and are configured to execute instruction code stored in the memory 110. The memory 110 stores instruction code that is executable by the processor 105 for controlling the system 100 to perform one or more operations. Some examples of the processor 105 correspond to Intel®, AMD®, ARM®, PowerPC®, etc. processors. Some examples of the instruction code implement an operating system, such as Linux®, Android®, etc. The instruction code facilitates performing, by the system 100, various operations examples of which are described below. In this regard, the instruction code can cause the processor 105 to control and coordinate various activities performed by the different subsystems of the system 100.

Some examples of the user interface 120 comprise display circuitry, audio circuitry, user input circuitry, etc. Some examples of the display circuitry include a liquid crystal display (LCD), light-emitting diode display (LED) display, etc. Some examples of the display include a transparent capacitive touch that facilitates receiving user commands. In this regard, some examples of the display circuitry are configured to present a graphical user interface (GUI) that facilities specifying, by the user, information. Some examples of the audio circuitry include one or more digital-to-analog converters (DAC), analog-to-digital converters (ADC), amplifiers, speakers, microphones, etc.

Some examples of the battery backup system 115 include an input terminal configured to receive a source voltage from a power source and an output terminal electrically coupled to the input terminal and a battery. In this regard, the battery backup system 115 is configured to selectively communicate the source voltage to the load 125 when the source voltage is available and to communicate a battery voltage to the load 125 when the source voltage is unavailable. For instance, some examples of the battery backup system 115 include a first switch $SW_1$ configured to electrically couple the input terminal of the battery backup system 115 to the output terminal of the battery backup system 115, and a second switch $SW_2$ configured to electrically couple the battery to the output terminal of the battery backup system 115.

Some examples of the battery backup system 115 include a power supply 130 configured to convert the source voltage to a charging voltage. For instance, the power supply 130 is configured to output a DC voltage that charges the battery to about the same voltage. Some examples of the power supply 130 include voltage regulation circuitry. In some examples, the voltage regulation circuitry corresponds to a linear regulator, a switch-mode regulator, etc., or a combination thereof that is configured to output a regulated voltage.

Some examples of the battery backup system 115 include control circuitry 135 electrically coupled to the power supply 130 and the battery. The control circuitry 135 is configured to communicate the charging voltage to the battery to facilitate charging the battery when the source voltage is available. Some examples of the control circuitry 135 are configured to measure one or more parameters of the battery to evaluate battery health. In this regard, when the battery polarity is reversed, terminals through which the battery is electrically coupled are shorted to one another, or battery replacement is performed while the battery backup system is live which may induce system transients, the control circuitry 135 is configured to decouple the charging voltage from the battery.

In some examples, the parameters include a battery voltage and a battery current. In this regard, some examples of the control circuitry 135 are configured to compare the battery voltage and the battery current with profile data associated with a nominal battery to determine whether the battery is operating nominally.

Figure 2:
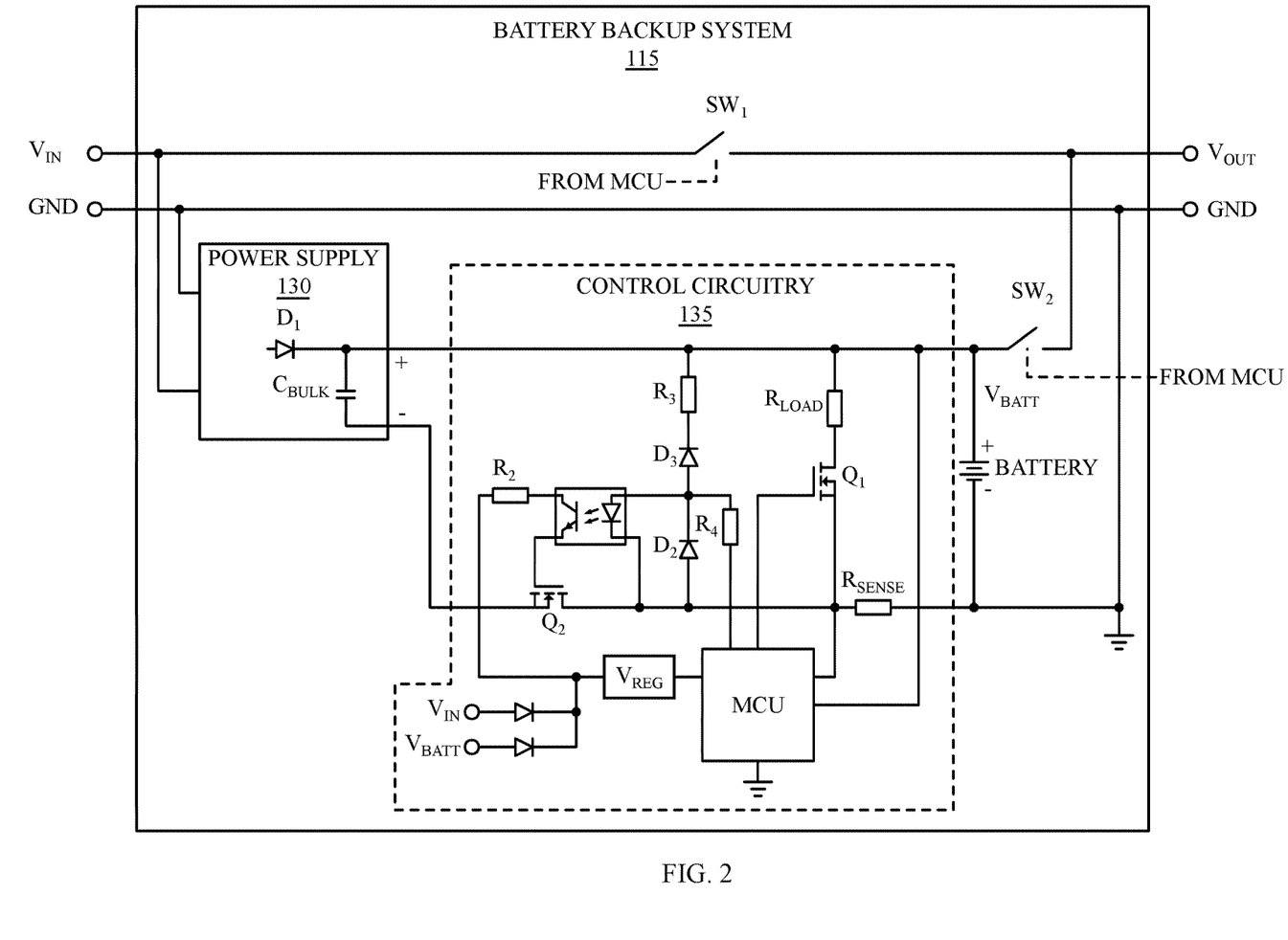
FIG. 2 illustrates a detailed view of control circuitry of a battery backup system, in accordance with example embodiments.

FIG. 2 illustrates a more detailed view of an example of the control circuitry 135 of the battery backup system 115. Referring to FIG. 2, a rail the control circuitry 135 is electrically coupled to the output voltage terminal of the power supply and to a battery. An example of the power supply 130 is characterized as having a diode, $D_1$, and capacitor, $C_{BULK}$, at the output voltage terminal.

Transistor $Q_1$ corresponds to a load switch that is configured to be controlled by an MCU to electrically couple the battery in series with load resistor $R_{LOAD}$ and sense resistor $R_{SENSE}$ to facilitate evaluating the health of the battery. In this regard, a first terminal of load resistor $R_{LOAD}$ is coupled to the rail, and a second terminal of load resistor $R_{LOAD}$ is coupled to the drain of transistor $Q_1$. The drain of transistor $Q_1$ is coupled to a first terminal of sense resistor $R_{SENSE}$. The gate of transistor $Q_1$ is coupled to a first control output of a microcontroller (MCU). The second terminal of sense resistor $R_{SENSE}$ is coupled to a ground node. The ground is also coupled to a negative battery terminal.

Transistor $Q_2$ corresponds to a power supply switch that is configured to be controlled by the MCU to electrically couple the battery to the power supply 130. In this regard, the source of transistor $Q_2$ is coupled in series to a negative or ground terminal of the power supply 130. The drain of transistor $Q_2$ is coupled to the first node of sense resistor $R_{SENSE}$. The gate of transistor $Q_2$ is coupled to the emitter terminal of an output transistor of an optical switch. The collector of the output transistor of the optical switch is coupled to a first terminal of resistor Ra. A second terminal of resistor Ra is coupled to a node that receives a voltage from either the input voltage of the battery backup system 115 or from the battery.

The cathode of the light-emitting diode (LED) of the optocoupler is coupled to the drain terminal of transistor $Q_2$. The anode of the LED is coupled to a first terminal of resistor $R_4$. The second terminal of resistor $R_4$ is coupled to a second control output of the MCU. The MCU is configured to output an actuation signal for controlling the state of transistor $Q_2$ via this output. The anode of the LED is also coupled to the anode of diode $D_3$ and the cathode of diode $D_2$. The cathode of diode $D_3$ is coupled to a first terminal of resistor $R_3$. The second terminal of resistor $R_3$ is coupled to the rail. The anode of diode D2 is coupled to the cathode of the LED of the optocoupler. In operation, the MCU outputs a signal that turns on (e.g., illuminates) the LED of the optocoupler. This, in turn, causes the output transistor of the optocoupler to close to thereby couple the voltage at the second terminal of resistor $R_2$ to the gate of transistor $Q_2$, which controls transistor $Q_2$ to close (e.g., conduct).

In operation, when evaluating the battery health, the MCU of the control circuitry 135 is configured to control the second switch $SW_2$ of the battery backup system 115 to electrically decouple the battery from the output terminal of the battery backup system 115. The MCU is further configured to control transistor $Q_2$ (e.g., power supply switch) to electrically decouple the battery from the power supply 130. The MCU is further configured to control transistor $Q_1$ (e.g., load switch) to electrically couple the battery to load resistor $R_{LOAD}$ and to sense resistor $R_{SENSE}$. This, in turn, causes current to flow from the positive terminal of the battery through load resistor $R_{LOAD}$, through sense resistor $R_{SENSE}$, and to the negative terminal of the battery. The MCU is then configured to measure the voltage across load resistor $R_{LOAD}$ and sense resistor $R_{SENSE}$ to determine, respectively, the voltage and corresponding current associated with the battery when driving load resistor $R_{LOAD}$. In some examples, the value of sense resistor $R_{SENSE}$ is selected to be much smaller (e.g., 0.1 Ohm) than load resistor $R_{LOAD}$ (e.g., 100 Ohm), so the voltage across sense resistor $R_{SENSE}$ is significantly smaller (e.g., 100×) than the voltage across load resistor $R_{LOAD}$. Some examples of the control circuitry 135 are configured to compare the voltage and the current with profile data associated with a nominal battery to determine whether the battery is operating nominally.

As noted above, replacement of the battery in a battery backup system 115 is not without risk. For example, an operator may replace the battery while the battery backup system 115 is operating, which may induce damaging transients to the battery backup system 115 or to a load the load 125. Further, the operator may inadvertently insert the battery in reverse or short the battery terminals. This could damage the battery backup system 115. Some examples of the control circuitry 135 are configured to ameliorate this issue. For instance, some examples of the control circuitry 135 are configured to prevent the actuation signal from reaching the power supply switch, thereby preventing the power supply switch from closing. This, in turn, ensures that the battery is decoupled from the power supply 130 when the battery terminals are shorted to one another, the battery is inserted in reverse, or while the battery is removed (e.g., battery is being replaced), thus ameliorating issues that may otherwise occur.

For example, as noted above, the MCU communicates the actuation signal via resistor $R_4$ to the anode of the LED of the optocoupler. When the battery terminals are shorted, the rail is grounded. Grounding of the rail forward biases diode $D_3$, turning diode $D_3$ on. This, in turn, sets up a voltage divider circuit between resistor $R_3$ and resistor $R_4$, where the voltage at the anode of the LED is given by the expression:

$$V_{ANODE\_LED} = V_{Actuation}\left(\frac{R_3}{R_3 + R_4}\right)$$

The values of resistors $R_3$ and $R_4$ are selected so that when the battery terminals are shorted, the voltage at the anode of the LED is below the forward voltage (e.g., 1.2 volts) of the LED by a margin significant enough to ensure the LED will not turn on. For instance, in an example, the values of resistors $R_3$ and $R_4$ are selected so that when the battery terminals are shorted and an actuation signal of, for example, 5 volts is being communicated from the MCU, the voltage at the anode of the LED is 0.5 volts.

When the polarity of the battery is reversed, the ground node will have a higher potential/voltage than the rail. Because the value of $R_{SENSE}$ is small (e.g., 0.1 Ohm), the voltage at the cathode of the LED and the anode of diode $D_2$ will be about the same as the ground voltage. The voltage at the cathode of diode $D_2$ will be lower than the voltage at the anode of diode $D_2$. Therefore, diode $D_2$ will become forward biased, and the voltage across diode $D_2$ and, therefore, across the LED diode will correspond to the forward voltage of diode $D_2$ (e.g., 0.7 volts). More specifically, the voltage between the anode and the cathode of the LED will correspond to the negative of the forward voltage (e.g., −0.7). Therefore, when an actuation signal of, for example, 5 volts is being communicated from the MCU, the voltage at the anode of the LED will nevertheless correspond to the negative of the forward voltage of diode $D_2$, thus preventing the actuation signal from turning on transistor $Q_2$.

As noted above, the battery is decoupled from the power supply 130 when the battery the battery is removed (e.g., battery is being replaced). In this regard, in some examples, the MCU continuously monitors the charging current through resistor $R_{SENSE}$. Once the MCU senses that the battery charging current is zero, the MCU will initially flag a status indicating that there is no battery connected. The MCU will turn off transistor Q2 and then determine whether battery voltage is present at the battery terminals. The "no battery" status will be retained if the voltage level is zero. When a battery voltage is detected, the MCU turns Q2 on to thereby facilitate charging of the battery. This prevents system transients from occurring when battery replacement is performed while the battery backup system is operating, e.g., receiving power from a power source and delivering the power to the load 125.

Figure 3:
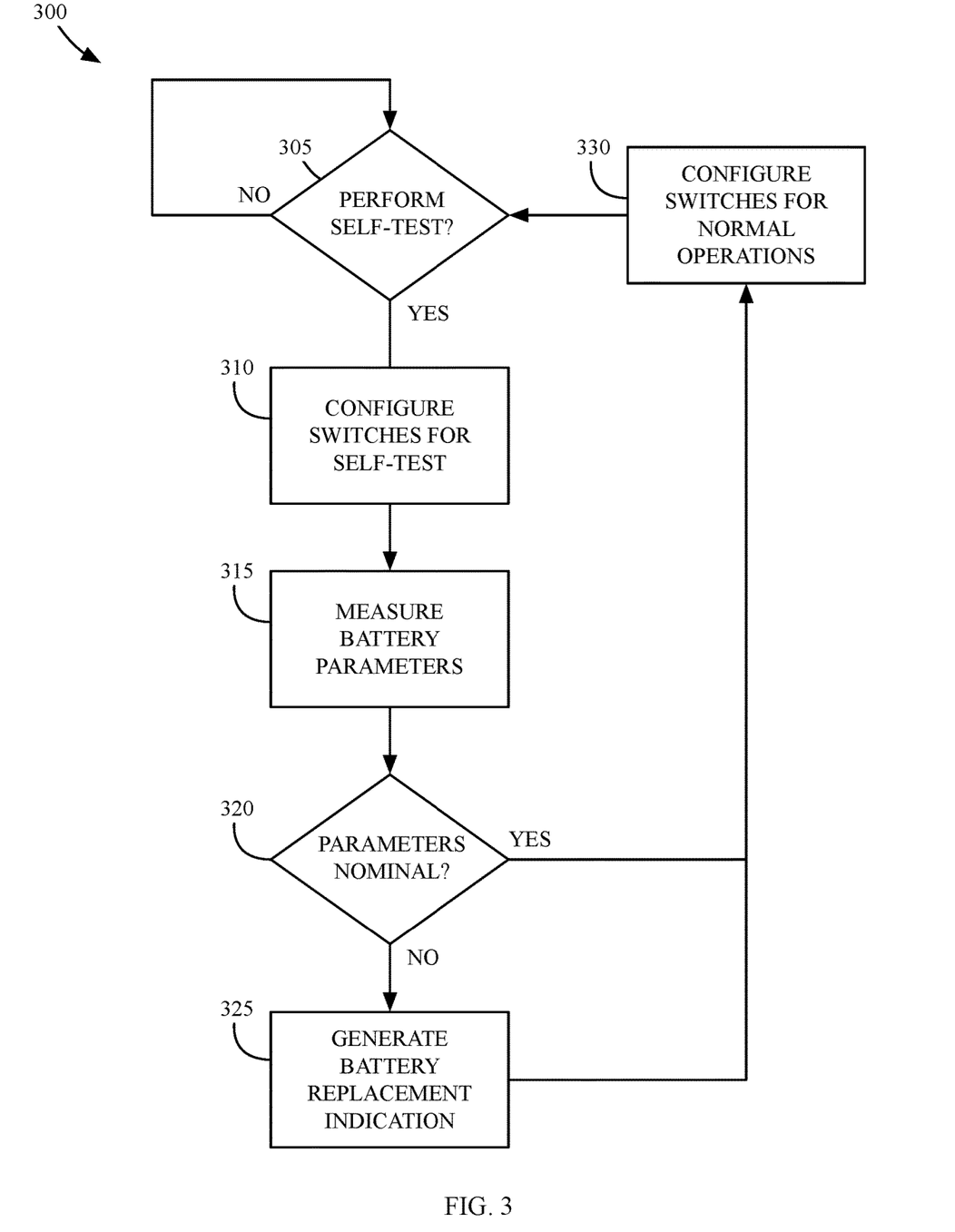
FIG. 3 illustrates self-test operations performed by a battery backup system that facilitate determining the health of the battery, in accordance with example embodiments.

FIG. 3 illustrates examples of self-test operations 300 performed by some examples of the battery backup system 115 that facilitate determining the health of the battery. In some examples, one or more of these operations are implemented by instruction code that is executable by a processor (e.g., the MCU) to control the processor to perform the operations either alone or in combination with other components described herein.

The operations at block 305 involve determining whether self-testing should commence. For instance, an example of the control circuitry 135 is configured to initiate a self-test on a periodic basis (e.g., once a week) and/or when requested to do so by an operator (e.g., via the user interface 120 described above).

If at block 305, self-testing should commence, then at block 310, one or more of the switches of the battery backup system 115 are controlled to enter a state (e.g., opened or closed) that facilitates the performance of the self-test. For instance, some examples of the control circuitry 135 are configured to control the second switch $SW_2$ of the battery backup system 115 to electrically decouple the battery from the output terminal of the battery backup system 115 and to control transistor $Q_2$ (e.g., power supply switch) to electrically decouple the battery from the power supply 130. The control circuitry 135 is further configured to control transistor $Q_1$ (e.g., load switch) to electrically couple the battery to load resistor $R_{LOAD}$ and to sense resistor $R_{SENSE}$. This, in turn, causes current to flow from the positive terminal of the battery through load resistor $R_{LOAD}$, through sense resistor $R_{SENSE}$, and to the negative terminal of the battery.

At block 315, parameters associated with the battery are measured. For example, the voltage across the battery and the current flowing through the battery while the battery drives the load resistor $R_{LOAD}$ are measured. In this regard, an example of the value of sense resistor $R_{SENSE}$ is selected to be much smaller (e.g., 0.1 Ohm) than load resistor $R_{LOAD}$ (e.g., 100 Ohm), so the voltage across sense resistor $R_{SENSE}$ is significantly smaller (e.g., 100x) than the voltage across load resistor $R_{LOAD}$. The current flowing through the battery is given by the expression:

$$I_{Battery} = \frac{V_{RSENSE}}{R_{SENSE}}$$

At block 320, the parameters of the battery are compared to parameters of a nominal battery to determine whether the battery is performing nominally. In this regard, an example of the MCU includes firmware having stored therein a table of one or more records that relate battery voltages and currents to a load 125 and a health indication. An example of the health indication specifies a percentage of useful life remaining in the battery (e.g., 50% life remaining, 10% life remaining, etc.). An example of the health indication is a binary indication of health (e.g., healthy, not healthy). An example of the health indication specifies text to be displayed via a user interface 120 (e.g., "Battery is healthy," "Replace battery soon," etc.).

If at block 320, the parameters indicate that the battery is not performing nominally, then at block 325, this is indicated. For instance, in an example, a battery health indicator LED is changed from green (e.g., healthy) to red (e.g., unhealthy). In another example, the indication specified in the table referred to above is presented via a user interface 120. Some examples of the battery backup system 115 include network communication circuitry that facilitates communicating the indication to a device in networked communication with the battery backup system 115.

At block 330, the switches configured at block 310 are reset/configured for normal operations. For instance, some examples of the control circuitry 135 are configured to control transistor $Q_1$ (e.g., load switch) to electrically decouple the battery from load resistor $R_{LOAD}$ and sense resistor $R_{SENSE}$. Some examples of the control circuitry 135 are further configured to control transistor $Q_2$ (e.g., power supply switch) to electrically couple the battery to the power supply 130.

Figure 4:
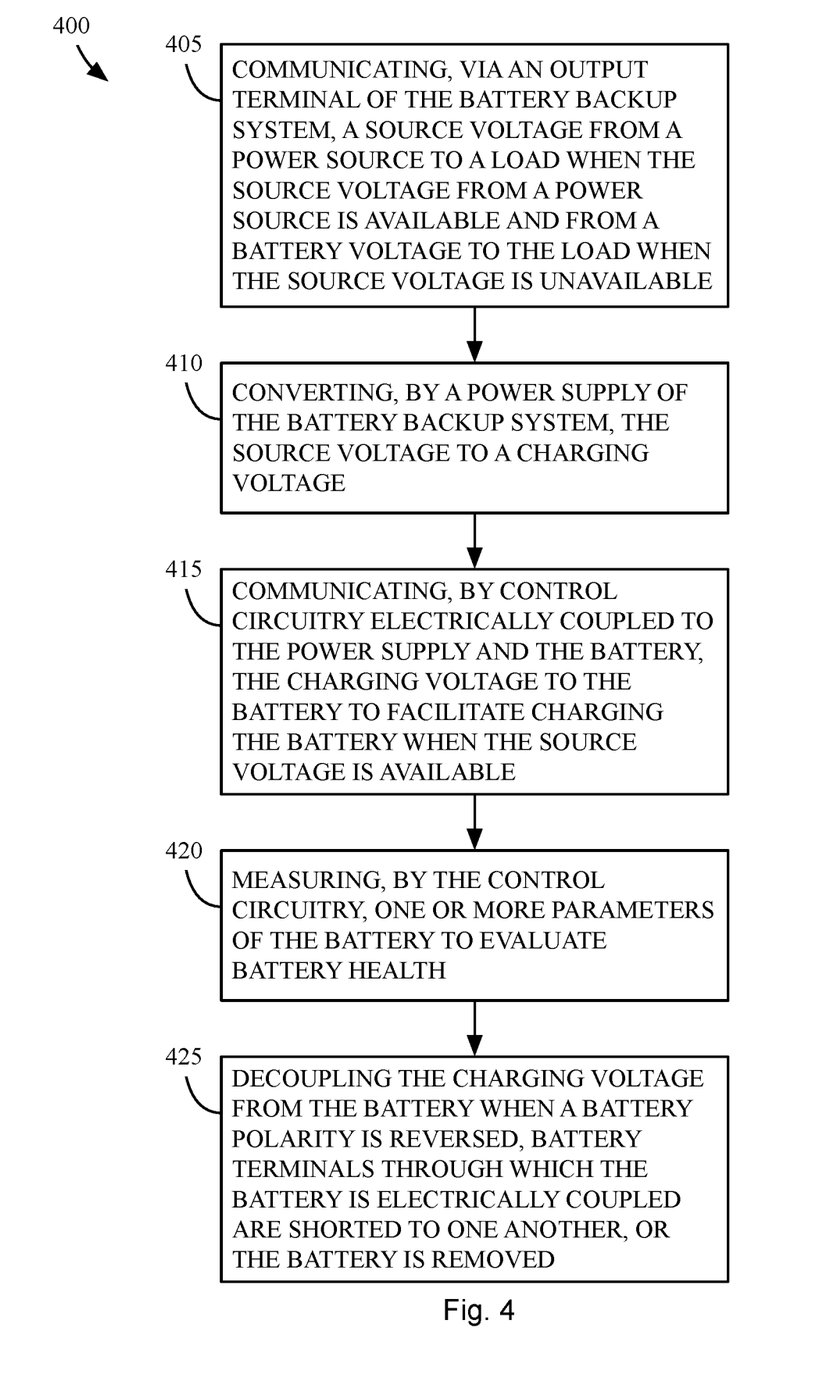
FIG. 4 illustrates operations performed by a battery backup system, in accordance with example embodiments.

FIG. 4 illustrates examples of operations 400 performed by an example of a battery backup system 115. Examples of the operations at block 405 involve communicating, via an output terminal of the battery backup system 115, a source voltage from a power source to a load when the source voltage from a power source is available and from a battery voltage to the load when the source voltage is unavailable.

Examples of the operations at block 410 involve converting, by a power supply 130 of the battery backup system 115, the source voltage to a charging voltage.

Examples of the operations at block 415 involve communicating, by control circuitry 135 electrically coupled to the power supply 130 and the battery, the charging voltage to the battery to facilitate charging the battery when the source voltage is available.

Examples of the operations at block 420 involve measuring, by the control circuitry, one or more parameters of the battery to evaluate battery health.

Examples of the operations at block 425 involve decoupling the charging voltage from the battery when a battery polarity is reversed, battery terminals through which the battery is electrically coupled are shorted to one another, or the battery is removed. That is, decoupling of the charging voltage occurs when any of these conditions occurs.

In some examples of the operations, measuring the one or more parameters involves measuring a battery voltage and a battery current. These operations further involve comparing, by the control circuitry, the battery voltage and the battery current with profile data associated with a nominal battery to determine whether the battery is operating nominally.

In some examples of the operations, communicating the source voltage from the power source to the load when the source voltage is available and from the battery voltage to the load when the source voltage is unavailable involves electrically coupling, by a first switch, the input terminal of the battery backup system 115 to the output terminal of the battery backup system 115 when the source voltage is available, and electrically coupling, by a second switch, the battery to the output terminal of the battery backup system 115 when the source voltage is unavailable. Communicating the charging voltage to the battery to facilitate charging the battery when the source voltage is available involves electrically coupling, by a power supply switch of the control circuitry, the battery to the power supply. Evaluating the battery health involves controlling the second switch and the power supply switch to electrically decouple the battery from the output terminal of the battery backup system 115 and the power supply, respectively; controlling a load switch to electrically couple the battery to a load resistor and a sense resistor that are in series with the load switch and the battery; and measuring the voltage across the load resistor and the sense resistor to determine, respectively, the battery voltage and the battery current when driving the load resistor.

Some examples of the operations involve communicating, by the control circuitry, an actuation signal to the power supply switch to close the power supply switch. These examples further involve, while the actuation signal is being communicated and the terminals through which the battery is electrically coupled are shorted to one another, preventing, by the control circuitry, the actuation signal from reaching the power supply switch to thereby control the power supply switch to open and decouple the battery from the power supply.

Some examples of the operations involve communicating, by the control circuitry, an actuation signal to the power supply switch to close the power supply switch. These examples further involve, while the actuation signal is being communicated and the terminals through which the battery is electrically coupled are coupled to the battery in reverse, preventing, by the control circuitry, the actuation signal from reaching the power supply switch to thereby control the power supply switch to open and decouple the battery from the power supply.

Some examples of the operations involve communicating, by the control circuitry, an actuation signal to the power supply switch to close the power supply switch. These examples further involve ceasing communication of the actuation signal when the battery is removed (e.g., while the battery backup system is operating), to thereby control the power supply switch to open and decouple the battery (e.g., battery terminals) from the power supply. These examples further involve, when a battery is inserted while the battery backup system is operating, resuming communicating, by the control circuitry, the actuation signal to thereby control the power supply switch to close and couple the battery to the power supply.

In some examples of the operations, the actuation signal is a voltage that energizes an LED of an input side of an optocoupler, and an output side of the optocoupler is electrically coupled to the second switch. In these examples, when the actuation signal is being communicated, and the terminals through which the battery is electrically coupled are shorted to one another, are coupled to the battery in reverse, or the battery is removed, the operations involve pulling, by the control circuitry, the voltage at the input side of the optocoupler to a level that de-energizes the LED to thereby control the second switch to open and decouple the battery from the power supply.

While the systems and methods of operation have been described with reference to certain examples, it will be understood by those skilled in the art that various changes can be made, and equivalents can be substituted without departing from the scope of the claims. Therefore, it is intended that the present methods and systems are not limited to any particular example disclosed herein, but that the disclosed methods and systems include all embodiments falling within the scope of the appended claims.

The invention claimed is:

1. A battery backup system comprising:
an input terminal configured to receive a source voltage from a power source;
an output terminal electrically coupled to the input terminal and a battery and configured to selectively communicate the source voltage to a load when the source voltage is available and to communicate a battery voltage to the load when the source voltage is unavailable;
a power supply configured to convert the source voltage to a charging voltage;
control circuitry electrically coupled to the power supply and the battery and configured to communicate the charging voltage to the battery to facilitate charging the battery when the source voltage is available, wherein the control circuitry is configured to measure one or more parameters of the battery to evaluate battery health, wherein when a battery polarity is reversed, battery terminals through which the battery is electrically coupled are shorted to one another, or the battery is removed, the control circuitry is configured to decouple the charging voltage from the battery;
a first switch configured to electrically couple the input terminal of the battery backup system to the output terminal of the battery backup system; and
a second switch configured to electrically couple the battery to the output terminal of the battery backup system; wherein the control circuitry comprises:
a power supply switch configured to electrically couple the battery to the power supply; and
a load switch configured to electrically couple the battery in series with a load resistor and a sense resistor, wherein when evaluating the battery health, the control circuitry is configured to:
control the second switch and the power supply switch to electrically decouple the battery from the output terminal of the battery backup system and the power supply, respectively,
control the load switch to electrically couple the battery to the load resistor and the sense resistor, and
measure the voltage across the load resistor and the sense resistor to determine, respectively, the battery voltage and the battery current when driving the load resistor.

2. The battery backup system according to claim 1, wherein the one or more parameters comprise a battery voltage and a battery current, wherein the control circuitry is configured to compare the battery voltage and the battery current with profile data associated with a nominal battery to determine whether the battery is operating nominally.

3. The battery backup system according to claim 1, wherein the control circuitry is configured to communicate an actuation signal to the power supply switch to close the power supply switch, wherein when the actuation signal is being communicated and the battery terminals are shorted to one another, the control circuitry is configured to prevent the actuation signal from reaching the power supply switch to thereby control the power supply switch to open and decouple the battery from the power supply.

4. The battery backup system according to claim 1, wherein the control circuitry is configured to communicate an actuation signal to the power supply switch to close the power supply switch, wherein when the actuation signal is being communicated and the battery terminals are coupled to the battery in reverse, the control circuitry is configured to prevent the actuation signal from reaching the power supply switch to thereby control the power supply switch to open and decouple the battery from the power supply.

5. The battery backup system according to claim 4, wherein the actuation signal is a voltage that energizes an LED of an input side of an optocoupler, wherein an output side of the optocoupler is electrically coupled to the second switch, wherein when the actuation signal is being communicated and the battery terminals are shorted to one another or are coupled to the battery in reverse, the control circuitry is configured to pull the voltage at the input side of the optocoupler to a level that de-energizes the LED to thereby control the second switch to open and decouple the battery from the power supply.

6. The battery backup system according to claim 1, wherein the control circuitry is configured to communicate an actuation signal to the power supply switch to close the power supply switch, wherein the control circuitry is configured to cease communication of the actuation signal when the battery is removed and to resume communication of the actuation signal when the battery is inserted.

7. The power supply according to claim 1, wherein the second switch is electrically coupled in series with a negative output terminal of the power supply.

8. A system comprising:
one or more processors;
one or more memories for storing instructions code that is executable by the one or more processors for controlling the system to perform one or more operations;
a battery backup system configured to provide power to the one or more processors and the one or more memories, wherein the battery backup system comprises:
an input terminal configured to receive a source voltage from a power source;
an output terminal electrically coupled to the input terminal and a battery and configured to selectively communicate the source voltage to a load when the source voltage is available and to communicate a battery voltage to the load when the source voltage is unavailable;
a power supply configured to convert the source voltage to a charging voltage; and
control circuitry electrically coupled to the power supply and the battery and configured to communicate the charging voltage to the battery to facilitate charging the battery when the source voltage is available, wherein the control circuitry is configured to measure one or more parameters of the battery to evaluate battery health, wherein when a battery polarity is reversed, or battery terminals through which the battery is electrically coupled are shorted to one another, or the battery is removed, the control circuitry is configured to decouple the charging voltage from the battery;
a first switch configured to electrically couple the input terminal of the battery backup system to the output terminal of the battery backup system; and
a second switch configured to electrically couple the battery to the output terminal of the battery backup system; wherein the control circuitry comprises:
a power supply switch configured to electrically couple the battery to the power supply; and
a load switch configured to selectively and electrically couple the battery in series with a load resistor and a sense resistor, wherein when evaluating the battery health, the control circuitry is configured to control the second switch and the power supply switch to electrically decouple the battery from the output terminal of the battery backup system and the power supply, respectively, control the load switch to electrically couple the battery to the load resistor and the sense resistor, and to measure the voltage across the load resistor and the sense resistor to determine, respectively, the battery voltage and the battery current when driving the load resistor.

9. The system according to claim 8, wherein the one or more parameters comprise a battery voltage and a battery current, wherein the control circuitry is configured to compare the battery voltage and the battery current with profile data associated with a nominal battery to determine whether the battery is operating nominally.

10. The system according to claim 8, wherein the control circuitry is configured to communicate an actuation signal to the power supply switch to close the power supply switch, wherein when the actuation signal is being communicated and the battery terminals are shorted to one another, the control circuitry is configured to prevent the actuation signal from reaching the power supply switch to thereby control the power supply switch to open and decouple the battery from the power supply.

11. The system according to claim 8, wherein the control circuitry is configured to communicate an actuation signal to the power supply switch to close the power supply switch, wherein when the actuation signal is being communicated and the battery terminals are coupled to the battery in reverse, the control circuitry is configured to prevent the actuation signal from reaching the power supply switch to thereby control the power supply switch to open and decouple the battery from the power supply.

12. The system according to claim 11, wherein the actuation signal is a voltage that energizes an LED of an input side of an optocoupler, wherein an output side of the optocoupler is electrically coupled to the second switch, wherein when the actuation signal is being communicated and the battery terminals are shorted to one another or are coupled to the battery in reverse, the control circuitry is configured to pull the voltage at the input side of the optocoupler to a level that de-energizes the LED to thereby control the second switch to open and decouple the battery from the power supply.

13. The battery backup system according to claim 8, wherein the control circuitry is configured to communicate an actuation signal to the power supply switch to close the power supply switch, wherein the control circuitry is configured to cease communication of the actuation signal when the battery is removed and to resume communication of the actuation signal when the battery is inserted.

14. The system according to claim 8, wherein the second switch is electrically coupled in series with a negative output terminal of the power supply.

15. A method performed by a battery backup system, the method comprising:
communicating, via an output terminal of the battery backup system, a source voltage from a power source to a load when the source voltage from a power source is available and from a battery voltage to the load when the source voltage is unavailable;
converting, by a power supply of the battery backup system, the source voltage to a charging voltage;

communicating, by control circuitry electrically coupled to the power supply and the battery, the charging voltage to the battery to facilitate charging the battery when the source voltage is available;

measuring, by the control circuitry, one or more parameters of the battery to evaluate battery health;

decoupling the charging voltage from the battery when a battery polarity is reversed, battery terminals through which the battery is electrically coupled are shorted to one another, or the battery is removed;

wherein measuring the one or more parameters comprises measuring a battery voltage and a battery current, wherein the method further comprises comparing, by the control circuitry, the battery voltage and the battery current with profile data associated with a nominal battery to determine whether the battery is operating nominally;

wherein communicating the source voltage from the power source to the load when the source voltage is available and from the battery to the load when the source voltage is unavailable comprises:

electrically coupling, by a first switch, an input terminal of the battery backup system to the output terminal of the battery backup system when the source voltage is available; and electrically coupling, by a second switch, the battery to the output terminal of the battery backup system when the source voltage is unavailable, communicating the charging voltage to the battery to facilitate charging the battery when the source voltage is available comprises:

electrically coupling, by a power supply switch of the control circuitry, the battery to the power supply, and evaluating the battery health comprises:

controlling the second switch and the power supply switch to electrically decouple the battery from the output terminal of the battery backup system and the power supply, respectively;

controlling a load switch to electrically couple the battery to a load resistor and a sense resistor that are in series with the load switch and the battery; and measuring the voltage across the load resistor and the sense resistor to determine, respectively, the battery voltage and the battery current when driving the load resistor.

16. The method according to claim 15, further comprising: communicating, by the control circuitry, an actuation signal to the power supply switch to close the power supply switch; and while the actuation signal is being communicated and the battery terminals are shorted to one another, preventing, by the control circuitry, the actuation signal from reaching the power supply switch to thereby control the power supply switch to open and decouple the battery from the power supply.

* * * * *